United States Patent Office

Re. 26,271
Reissued Sept. 26, 1967

26,271

REDUCTIVE ALKYLATION PROCESS

James Howard Boothe, Montvale, N.J., and Joseph Petisi, Suffern, N.Y., assignors to American Cyanamid Company, Stamford, Conn., a corporation of Maine No Drawing. Original No. 3,148,212, dated Sept. 8, 1964, Ser. No. 161,412, Dec. 22, 1961. Application for reissue Dec. 20, 1966, Ser. No. 606,499
20 Claims. (Cl. 260—559)

Matter enclosed in heavy brackets [ ] appears in the original patent but forms no part of this reissue specification; matter printed in italics indicates the additions made by reissue.

This invention relates to a novel reductive alkylation process for preparing compounds having the following general formula:

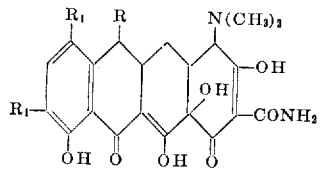

wherein R is hydrogen or methyl and $R_1$ and $R_2$ are hydrogen, mono(lower alkyl)amino or di(lower alkyl) amino with the proviso that $R_1$ and $R_2$ cannot both be hydrogen. More particularly, the present invention comprises interacting a compound of the general formula:

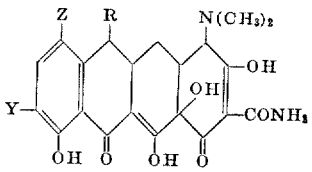

wherein R is hydrogen or methyl and Y and Z are hydrogen, amino, a substituent reducible to amino, mono (lower alkyl)amino or a substituent reducible to mono (lower alkyl)amino with the proviso that Y and Z cannot both be hydrogen, with a carbonyl compound of the general formula:

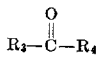

wherein $R_3$ is hydrogen or lower alkyl and $R_4$ is hydrogen or lower alkyl, in the presence of a reducing agent.

It is to be understood that when the term "lower alkyl" is used throughout this specification, it is meant to include all lower alkyl groups having up to about 6 carbon atoms. Accordingly, aldehydes and ketones useful in carrying out the novel reductive alkylation of the present invention include, for example, formaldehyde, acetaldehyde, propionaldehyde, n-butyraldehyde, isobutyraldehyde, acetone, methyl ethyl ketone, diethyl ketone, etc.

In the second general formula set forth above, the substituents Y and Z are defined as hydrogen, amino, a substituent reducible to amino, mono(lower alkyl) amino or a substituent reducible to mono(lower alkyl) amino with the proviso that Y and Z cannot both be hydrogen. Suitable substituents reducible to amino may be, for example, nitro, nitroso, diazonium halide, benzeneazo, substituted-benzeneazo, etc. Where $R_1$ and/or $R_2$ in the first general formula set forth above are disubstituted amino groups, such products may be prepared in either of two ways according to the novel process of the present invention. In the first situation, Y and/or Z may be amino or a substituent reducible to amino and reductive dialkylation on an unsubstituted amino group occurs, whereby a disubstituted amino group is obtained.

In the second situation, Y and/or Z may be mono(lower alkyl)amino or a substituent reducible to mono(lower alkyl)amino and reductive monoalkylation on a monoalkyl-substituted amino group occurs, whereby a disubstituted amino group is obtained. Suitable mono(lower alkyl)amino groups may be, for example, methylamino, ethylamino, n-propylamino, isopropylamino, n-butylamino, iso-butylamino, t-butylamino, etc. Suitable substituents reducible to mono(lower alkyl)amino may be, for example, formylamino, acetylamino, N-(lower alkyl)hydroxylamino, and the like. Specific starting materials operable in the novel process of the present invention include 7-nitro-6-deoxy-6-demethyltetracycline,
7-amino-6-deoxy-6-demethyltetracycline,
9-nitro-6-deoxy-6-demethyltetracycline,
9-amino-6-deoxy-6-demethyltetracycline,
7,9-dinitro-6-deoxy-6-demethyltetracycline,
7,9-diamino-6-deoxy-6-demethyltetracycline,
7-nitro-6-deoxytetracycline,
7-amino-6-deoxytetracycline,
9-nitro-6-deoxytetracycline,
9-amino-6-deoxytetracycline,
7,9-diamino-6-deoxytetracycline,
9-amino-7-nitro-6-deoxy-6-demethyltetracycline,
9-amino-7-nitro-6-deoxytetracycline,
7-formylamino-6-deoxy-6-demethyltetracycline,
9-formylamino-6-deoxy-6-demethyltetracycline,
7-acetylamino-6-deoxytetracycline,
9-acetylamino-6-deoxytetracycline,
7,9-diacetylamino-6-deoxytetracycline,
7-nitro-9-acetylamino-6-deoxytetracycline,
6-deoxy-6-demethyltetracycline-7-diazonium chloride,
6-deoxy-6-demethyltetracycline-9-diazonium chloride,
6-deoxytetracycline-9-diazonium chloride,
9-nitro-5-hydroxy-6-deoxytetracycline,
9-amino-5-hydroxy-6-deoxytetracycline, and the like. The tetracycline starting materials for the novel process of the present invention may be prepared by following the procedures set forth in Austrian Patent No. 212,308 to American Cyanamid Company, in the articles by Beereboom et al., J.A.C.S. 82, 1003 (1960), and by Boothe et al., J.A.C.S. 82, 1253 (1960), and in the copending application of Petisi and Boothe, Serial No. 65,584, filed October 28, 1960. The tetracycline starting materials may be employed in the novel process of the present invention either in the form of their free bases or in the form of their salts with various organic and inorganic acids depending upon whether solubility in polar or non-polar solvent system is desired.

The novel reductive alkylation process of the present invention may be accomplished by either chemical or catalytic reduction using procedures well-known to those in the art. Catalytic reduction, which is especially suited for the reductive alkylation of the tetracycline starting compounds set forth above, may be accomplished in a solvent for the tetracycline starting compound in the presence of a carbonyl compound and a metal catalyst and hydrogen gas at pressures from atmospheric to superatmospheric. Ordinarily, the reductive alkylation is conveniently carried out at hydrogen pressures of from about one to about four atmospheres. Temperatures do not appear to be critical in the catalytic hydrogenation. Temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific tetracycline starting compound. Generally, the catalytic reductive alkylation may be carried out in solvents such as water, lower alkanols, e.g. methanol, ethanol; lower alkoxy lower alkanols, e.g. 2-methoxyethanol, 2-ethoxyethanol; tetrahydrofuran, dioxane, dimethylformamide, etc.

A variety of chemical reducing agents may be used in the novel reductive alkylation process of the present invention. These include reduction with active metals in mineral acids, e.g., zinc, tin, or iron in hydrochloric acid; reduction with metal couples such as the copper-zinc couple, the tin-mercury couple, aluminum amalgam, or magnesium amalgam; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the tetracycline starting compound is of limited solubility in the reaction mixture. The water-miscible solvent does not alter the course of the reduction but merely provides for more efficient reduction, e.g. a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

The products are obtained from the reductive alkylation reaction mixtures by standard procedures. For example, the products may be isolated from the catalytic hydrogenation reaction mixtures, after filtration of the catalyst, by precipitation with a solvent such as ether or hexane or by concentration, usually under reduced pressure, or by a combination of these. Work-up of the chemical reductive alkylation reaction mixtures to obtain the desired products may also be accomplished by known procedures such as precipitation, concentration, solvent extraction, or combinations of these procedures. After isolation, the products may be purified by any of the generally known methods for purification of tetracycline compounds. These include recrystallization from various solvents and mixed solvent systems, chromatographic techniques, and counter current distribution, all of which are usually employed for this purpose.

Typical compounds which may be prepared by the novel reductive alkylation process of the present invention include, for example, 7-methylamino-6-deoxy-6-demethyltetracycline,
7-ethylamino-6-deoxy-6-demethyltetracycline,
7-iso-propylamino-6-deoxy-6-demethyltetracycline,
9-methylamino-6-deoxy-6-demethyltetracycline,
9-ethylamino-6-deoxy-6-demethyltetracycline,
9-iso-propylamino-6-deoxy-6-demethyltetracycline,
7,9-di(ethylamino)-6-deoxy-6-demethyltetracycline,
7-dimethylamino-6-deoxy-6-demethyltetracycline,
9-dimethylamino-6-deoxy-6-demethyltetracycline,
7-methylamino-6-deoxytetracycline,
9-ethylamino-6-deoxytetracycline,
7,9-di(methylamino)-6-deoxy-tetracycline,
7-diethylamino-6-deoxytetracycline,
9-diethylamino-6-deoxytetracycline,
7,9-di(methylethylamino)-6-deoxytetracycline,
7-methylamino-9-ethylamino-6-deoxytetracycline, and
9-methylamino-5-hydroxy-6-deoxytetracycline.

The tetracyclines produced by the novel reductive alkylation process of the present invention are biologically active and possess the broad-spectrum anti-bacterial activity of the previously known tetracyclines. In particular, the [7-methylamino]*7-dimethylamino*-6-deoxy-6-demethyltetracycline possesses extraordinary activity both orally and parenterally against Staphylococcus aureus, strain Smith, and Staphylococcus aureus, strain Rose, infections in mice.

The invention will be described in greater detail in conjunction with the following specific examples.

EXAMPLE 1

Reductive methylation of 7-amino-6-deoxy-6-demethyltetracycline to yield [7-methylamino]*7-dimethylamino*-6-deoxy-6-demethyltetracycline A solution of 792.9 mg. of 7-amino-6-deoxy-6-demethyltetracycline sulfate in 90 ml. of methyl Cellosolve, 1.5 ml. of 40% aqueous formaldehyde solution, and 300 mg. of 10% palladium-on-carbon catalyst was hydrogenated at room temperature and atmospheric pressure. Uptake of between one and one and one-half equivalents of hydrogen was complete in one to two hours. The catalyst was filtered off and the orange solution poured into 1.5 liters of dry ether. The precipitate was filtered off, washed well with dry ether and dried; weight, 391 mg.

EXAMPLE 2

Reductive methylation of 7-amino-6-deoxy-6-demethyltetracycline to yield [7-methylamino]*7-dimethylamino*-6-deoxy-6-demethyltetracycline A solution of 527 mg. of 7-amino-6-deoxy-6-demethyltetracycline sulfate, 0.25 ml. of 97% formic acid, and 0.2 ml. of 37% formaldehyde solution was heated to reflux for 2 hours. The cooled mixture was taken up in 100 ml. of water. Paper chromatography revealed the presence of [7-methylamino]*7-dimethylamino*-6-deoxy-6-demethyltetracycline and its 4-epimer.

EXAMPLE 3

Reductive methylation of 7-nitro-6-deoxy-6-demethyltetracycline to yield [7-methylamino]*7-dimethylamino*-6-deoxy-6-demethyltetracycline A solution of 278.7 mg. of 7-nitro-6-deoxy-6-demethyltetracycline sulfate in 15 ml. of 93% methyl Cellosolve (7% water), 0.75 ml. of 40% aqueous formaldehyde solution and 50 mg. of 10% palladium-on-carbon catalyst was hydrogenated at room temperature and atmospheric pressure. Uptake was [complete (]four equivalents[)] in two hours. After removal of the catalyst by filtration, the solution was poured into 300 ml. of dry ether. The precipitate was collected by filtration, washed well with dry ether, and dried; weight, 200 mg.

EXAMPLE 4

Reductive methylation of 9-amino-6-deoxy-6-demethyltetracycline to yield [9-methylamino]*9-dimethylamino*-6-deoxy-6-demethyltetracycline A solution of 233.5 mg. of 9-amino-6-deoxy-6-demethyltetracycline hydrochloride in 8 ml. of 0.1 N methanolic hydrochloric acid, 15 ml. of methyl Cellosolve, 0.5 ml. of 40% aqueous formaldehyde solution, and 100 mg. of 10% palladium-on-carbon catalyst was hydrogenated at room temperature and atmospheric pressure. Uptake of one to one and one-half equivalents of hydrogen was complete in less than one hour. The catalyst was filtered off, and the solution poured into 250 ml. of dry ether. The precipitate was washed well with dry ether and dried; weight, 171 mg.

EXAMPLE 5

Reductive methylation of 9-nitro-6-deoxy-6-demethyltetracycline to yield [9-methylamino]*9-dimethylamino*-6-deoxy-6-demethyltetracycline A solution of 114.8 mg. of 9-nitro-6-deoxy-6-dimethyltetracycline in 20 ml. of methanol containing 2.5 ml. of 0.1 N methanolic hydrochloric acid, 0.4 ml. of 40% aqueous formaldehyde solution, and 50 mg. of 10% palladium-on-carbon catalyst was hydrogenated at room temperature and atmospheric pressure. Uptake was complete [(85% of theory)] in one hour. After filtration of the catalyst, the solution was evaporated to dryness; weight, 115 mg.

EXAMPLE 6

Reductive ethylation of 7-amino-6-deoxy-6-demethyltetracycline to yield [7-ethylamino]*7-diethylamino*-6-deoxy-6-dimethyltetracycline A solution of 396 mg. of 7-amino-6-deoxy-6-demethyltetracycline sulfate in 50 ml. of methyl Cellosolve was hydrogenated at room temperature and atmospheric pressure using 2 ml. of acetaldehyde and 150 mg. of 10% palladium-on-carbon. Uptake stopped after 3 hours and the catalyst was removed by filtration and the solution poured into 750 ml. of dry ether. The precipitate was filtered off, washed well with dry ether and dried; weight, 64 mg.

EXAMPLE 7

Reductive ethylation of 7-nitro-6-deoxy-6-demethyltetracycline to yield [7-ethylamino]*7-diethylamino*-6-deoxy-6-demethyltetracycline In 30 ml. of methyl Cellosolve was suspended 560 mg. of 7-nitro-6-deoxy-6-demethyltetracycline sulfate, 2.1 ml. of 1 N sulfuric acid, 1.0 ml. of acetaldehyde, and 100 mg. of 10% palladium-on-charcoal. The mixture was shaken with hydrogen for 1.5 hours and the catalyst was then removed by filtration. The filtrate was poured into about 400 ml. of ether which precipitated a light colored solid. The product after filtering and drying weighed 582 mg. and consisted mostly of [7-ethylamino]*7-diethylamino*-6-deoxy-6-demethyltetracycline.

EXAMPLE 8

Reductive iso-propylation of 7-nitro-6-deoxy-6-demethyltetracycline to yield 7-iso-propylamino-6-deoxy-6-demethyltetracycline A solution of 200 mg. of 7-nitro-6-deoxy-6-demethyltetracycline sulfate and 0.15 ml. of acetone in a mixture of 5.5 ml. of water and 5.5 ml. of ethanol was reduced in a Paar shaker with hydrogen and platinum oxide as a catalyst. The system absorbed 42 ml. of hydrogen during a two hour period. The catalyst was filtered and the filtrate evaporated to dryness in vacuo. The residue was dissolved in 3 ml. of MeOH and diluted with 150 ml. of ether. The solid product that separated weighed 115 mg.

What is claimed is:

1. The process of preparing compounds of the formula:

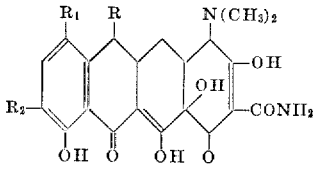

wherein R is selected from the group consisting of hydrogen and methyl and $R_1$ and $R_2$ are each selected from the group consisting of hydrogen, mono(lower alkyl) amino and di(lower alkyl)amino with the proviso that $R_1$ and $R_2$ cannot both be hydrogen, which comprises contacting a compound of the formula:

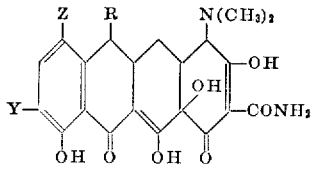

wherein R is selected from the group consisting of hydrogen and methyl and Y and Z are each selected from the group consisting of hydrogen, amino, a substituent reducible to amino, mono(lower alkyl)amino and a substituent reducible to mono(lower alkyl)amino with the proviso that Y and Z cannot both be hydrogen, with a carbonyl compound of the formula:

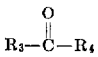

wherein $R_3$ is selected from the group consisting of hydrogen and lower alkyl and $R_4$ is selected from the group consisting of hydrogen and lower alkyl, in the presence of a reducing agent.

2. The process of preparing compounds of the formula:

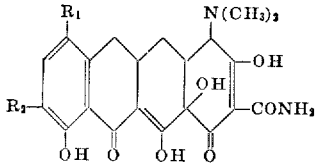

wherein Y and Z are each selected from the group consisting of hydrogen, mono(lower alkyl)amino and di(lower alkyl)amino with the proviso that $R_1$ and $R_2$ cannot both be hydrogen, which comprises contacting a compound of the formula:

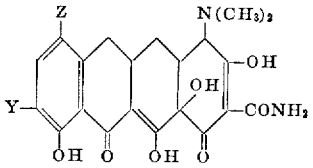

wherein Y and Z are each selected from the group consisting of hydrogen, amino, a substituent reducible to amino, mono(lower alkyl)amino and a substituent reducible to mono(lower alkyl)amino with the proviso that Y and Z cannot both be hydrogen, with a carbonyl compound of the formula:

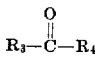

wherein $R_3$ is selected from the group consisting of hydrogen and lower alkyl and $R_4$ is selected from the group consisting of hydrogen and lower alkyl, in the presence of a reducing agent.

3. The process of preparing compounds of the formula:

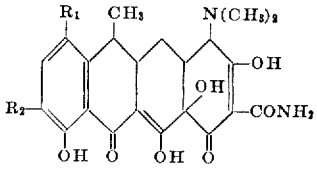

wherein $R_1$ and $R_2$ are each selected from the group consisting of hydrogen, mono(lower alkyl)amino and di(lower alkyl)amino with the proviso that $R_1$ and $R_2$ cannot both be hydrogen, which comprises contacting a compound of the formula:

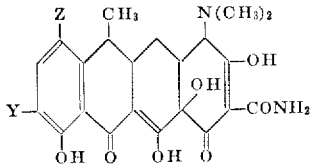

wherein Y and Z are each selected from the group consisting of hydrogen, amino, a substituent reducible to amino, mono(lower alkyl)amino and a substituent-reducible to mono(lower alkyl)amino with the proviso that Y and Z cannot both be hydrogen, with a carbonyl compound of the formula:

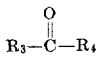

wherein $R_3$ is selected from the group consisting of hydrogen and lower alkyl and $R_4$ is selected from the group consisting of hydrogen and lower alkyl, in the presence of a reducing agent.

4. The process of preparing compounds of the formula:

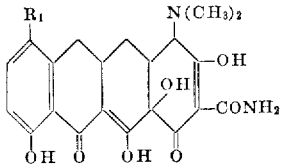

wherein $R_1$ is selected from the group consisting of mono-(lower alkyl)amino and di(lower alkyl)amino, which comprises contacting 7 - nitro-6-deoxy-6-demethyltetracycline with a carbonyl compound of the formula:

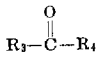

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

5. The process of preparing compounds of the formula:

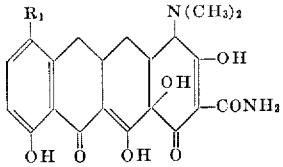

wherein $R_1$ is selected from the group consisting of mono-(lower alkyl)amino and di(lower alkyl)amino, which comprises contacting 7-amino-6-deoxy-6-demethyltetracycline with a carbonyl compound of the formula:

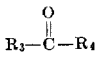

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

6. The process of preparing compounds of the formula:

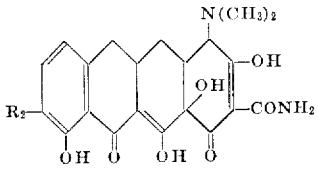

wherein $R_2$ is selected from the group consisting of mono-(lower alkyl)amino and di(lower alkyl)amino, which comprises contacting 9 - nitro - 6-deoxy-6-demethyltetracycline with a carbonyl compound of the formula:

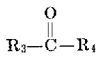

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

7. The process of preparing compounds of the formula:

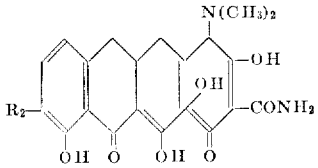

wherein $R_2$ is selected from the group consisting of mono-(lower alkyl)amino and di(lower alkyl)amino, which comprises contacting 9-amino-6-deoxy-6-demethyltetracycline with a carbonyl compound of the formula:

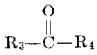

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

8. The process of preparing compounds of the formula:

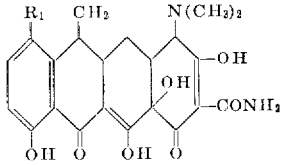

wherein $R_1$ is selected from the group consisting of mono-(lower alkyl)amino and di(lower alkyl)amino, which comprises contacting 7-nitro-6-deoxytetracycline with a carbonyl compound of the formula:

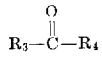

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

9. The process of preparing compounds of the formula:

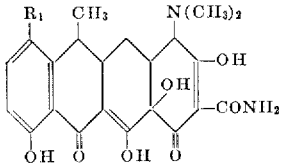

wherein $R_1$ is selected from the group consisting of mono-(lower alkyl)amino and di(lower alkyl)amino, which comprises contacting 7-amino-6-deoxytetracycline with a carbonyl compound of the formula:

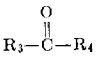

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

10. The process of preparing compounds of the formula:

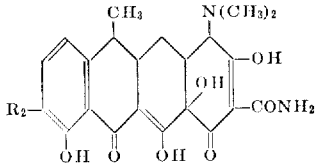

wherein $R_2$ is selected from the group consisting of mono-(lower alkyl)amino and di(lower alkyl)amino, which comprises contacting 9-nitro-6-deoxytetracycline with a carbonyl compound of the formula:

$$R_3-\overset{\overset{\displaystyle O}{\|}}{C}-R_4$$

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

11. The process of preparing compounds of the formula:

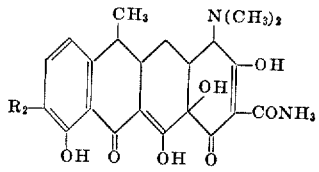

wherein $R_2$ is selected from the group consisting of mono-(lower alkyl)amino and di(lower alkyl)amino, which comprises contacting 9-amino-6-deoxytetracycline with a carbonyl compound of the formula:

$$R_3-\overset{\overset{\displaystyle O}{\|}}{C}-R_4$$

wherein $R_3$ is selected from the group consisting of hydrogen and lower alkyl and $R_4$ is selected from the group consisting of hydrogen and lower alkyl, in the presence of hydrogen and a noble metal hydrogenation catalyst.

12. A process for the preparation of 7-methylamino-6-deoxy - 6 - demethyltetracycline which comprises contacting with hydrogen a solution of formaldehyde and 7-nitro-6-deoxy-6-demethyltetracycline in a solvent therefor having suspended therein a catalyst selected from the group consisting of palladium and platinum distributed on an inert carrier, and recovering the 7-methylamino-6-deoxy-6-demethyltetracycline so produced.

13. A process for the preparation of 7-methylamino-deoxy - 6 - demethyltetracycline which comprises contacting with hydrogen a solution of formaldehyde and 7-amino-6-deoxy-6-demethyltetracycline in a solvent therefor having suspended therein a catalyst selected from the group consisting of palladium and platinum distributed on an inert carrier, and recovering the 7-methylamino-6-deoxy-6-demethyltetracycline so produced.

14. A process for the preparation of 9-methylamino-6-deoxy - 6 - demethyltetracycline which comprises contacting with hydrogen a solution of formaldehyde and 9-nitro-6-deoxy-6-demethyltetracycline in a solvent therefor having suspended therein a catalyst selected from the group consisting of palladium and platinum distributed on an inert carrier, and recovering the 9-methylamino-6-deoxy-6-demethyltetracycline so produced.

15. A process for the preparation of 9-methylamino-6-deoxy - 6 - demethyltetracycline which comprises contacting with hydrogen a solution of formaldehyde and 9-amino-6-deoxy-6-demethyltetracycline in a solvent therefor having suspended therein a catalyst selected from the group consisting of palladium and platinum distributed on an inert carrier, and recovering the 9-methylamino-6-deoxy-6-demethyltetracycline so produced.

16. A process for the preparation of 7-ethylamino-6-deoxy - 6 - demethyltetracycline which comprises contacting with hydrogen a solution of acetaldehyde and 7-nitro-6-deoxy-6-demethyltetracycline in a solvent therefor having suspended therein a catalyst selected from the group consisting of palladium and platinum distributed on an inert carrier, and recovering the 7-ethylamino-6-deoxy-6-demethyltetracycline so produced.

17. A process for the preparation of 7-ethylamino-6-deoxy - 6 - demethyltetracycline which comprises contacting with hydrogen a solution of acetaldehyde and 7-amino-6-deoxy-6-demethyltetracycline in a solvent therefor having suspended therein a catalyst selected from the group consisting of palladium and platinum distributed on an inert carrier, and recovering the 7-ethylamino-6-deoxy-6-demethyltetracycline so produced.

18. A process for the preparation of 7-isopropylamino-6-deoxy - 6 - demethyltetracycline which comprises contacting with hydrogen a solution of acetone and 7-amino-6-deoxy-6-demethyltetracycline in a solvent therefor having suspended therein a catalyst selected from the group consisting of palladium and platinum distributed on an inert carrier, and recovering the 7-isopropylamino-6-deoxy-6-demethyltetracycline so produced.

19. A process for the preparation of 7-methylamino-6-deoxy - 6 - demethyltetracycline which comprises contacting with hydrogen, at a pressure of from about 1 to about 4 atmospheres, a solution of formaldehyde and 7-nitro-6-deoxy-6-demethyltetracycline in a solvent therefor having suspended therein a palladium-on-carbon catalyst for a period of time of from about 0.5 to about 5.0 hours, and recovering the 7-methylamino-6-deoxy-6-demethyltetracycline so produced.

20. A process for the preparation of 7-methylamino-6-deoxy - 6 - demethyltetracycline which comprises contacting with hydrogen, at a pressure of from about 1 to about 4 atmospheres, a solution of formaldehyde and 7-amino-6-deoxy-6-demethyltetracycline in a solvent therefor having suspended therein a palladium - on - carbon catalyst for a period of time of from about 0.5 to about 5.0 hours, and recovering the 7-methylamino-6-deoxy-6-demethyltetracycline so produced.

No references cited.

NICHOLAS S. RIZZO, *Primary Examiner.*